United States Patent [19]

Lewis et al.

[11] 4,254,504
[45] Mar. 3, 1981

[54] CONTROL APPARATUS FOR A TRANSCEIVER EMPLOYING A PROGRAMMABLE MEMORY

[75] Inventors: James P. Lewis, Raleigh; James C. Carroll, Apex, both of N.C.

[73] Assignee: International Telephone and Telegraph Corporation, New York, N.Y.

[21] Appl. No.: 932,066

[22] Filed: Aug. 8, 1978

[51] Int. Cl.³ .................................. H04B 1/40
[52] U.S. Cl. ................................ 455/76; 455/77; 455/87; 455/176; 455/180; 455/183; 455/185; 455/200

[58] Field of Search .............. 325/15, 17, 21, 25, 325/62, 144, 419, 422, 464, 187, 453, 459, 421, 457; 331/1 A, 15, 18, 25; 455/76, 77, 87, 173, 175, 176, 177, 179, 180, 183, 185, 186, 188, 200

[56] References Cited

U.S. PATENT DOCUMENTS

| | | | |
|---|---|---|---|
| 3,300,720 | 1/1967 | Kowols | 325/20 |
| 3,886,453 | 5/1975 | Quintiliani et al. | 325/25 |
| 3,886,457 | 5/1975 | Petaja | 325/457 |
| 3,949,305 | 4/1976 | McClaskey et al. | 325/421 |
| 3,983,484 | 9/1976 | Hodama | 325/421 |
| 4,013,957 | 3/1977 | Tojo | 325/25 |
| 4,015,253 | 3/1977 | Goldstein | 325/455 |
| 4,078,213 | 3/1978 | Campioni | 325/459 |
| 4,092,594 | 5/1978 | Baker | 325/21 |
| 4,093,921 | 6/1978 | Buss | 325/464 |
| 4,123,724 | 10/1978 | Das et al. | 331/1 A |
| 4,198,601 | 4/1980 | Ono et al. | 455/77 |

OTHER PUBLICATIONS

PR1010 Regional Crime Squad Radio Transceiver–A. D. Currah, Plessey Company Ltd., Int. Conf. on Comm. Eqpmnt. and Systems, Brighton, Sussex, England–Jun., 1976.

*Primary Examiner*—Marc E. Bookbinder
*Attorney, Agent, or Firm*—John T. O'Halloran; Alfred C. Hill

[57] ABSTRACT

A transceiver is controlled in operation by a programmable read only memory (PROM). The memory is accessed directly via a series of switches and when accessed, provides output data necessary to control the operation of the transceiver by controlling the frequency, the output power level and the mode of operation, as well as providing data to prevent transmission of unauthorized frequencies. The memory permits rapid and reliable programming of the apparatus enabling an untrained operator to use the equipment with reduced risk of unauthorized operation.

18 Claims, 3 Drawing Figures

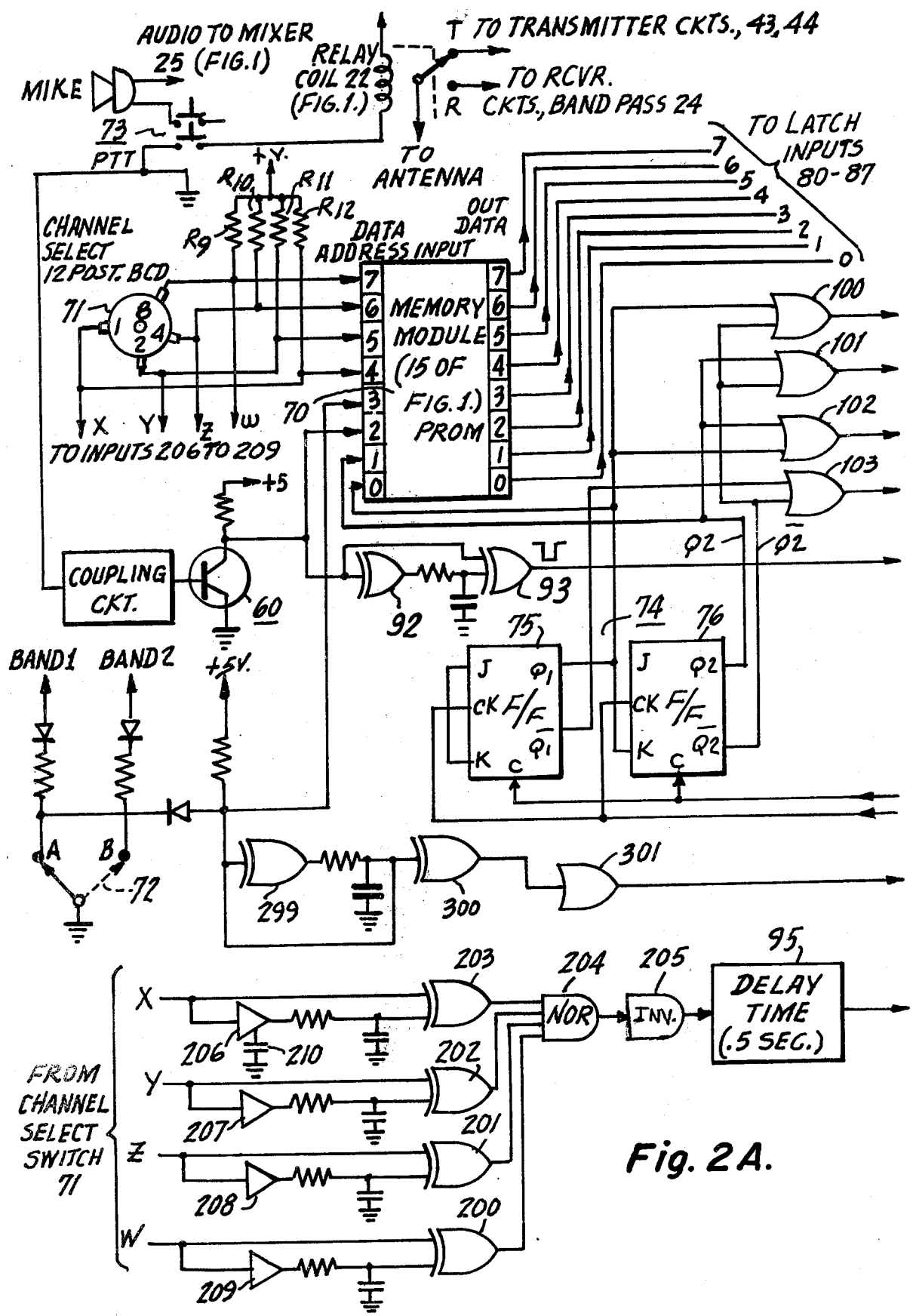

CONTROL APPARATUS FOR A TRANSCEIVER EMPLOYING A PROGRAMMABLE MEMORY

BACKGROUND OF INVENTION

This invention relates to apparatus for programming a radio transmitter or receiver and more particularly to automatic apparatus adapted to program a transceiver rapidly and reliably.

There exists many radio receivers and transmitters which are employed by the public in relatively widespread applications. As is known, a class of such transceivers operate in the frequency spectrum reserved for mobile radiotelephone facilities. Such transceivers are located directly in a vehicle and enable one to utilize telephone facilities via an automobile or other vehicle. It is desirable in such an environment to enable an untrained operator to employ the transceiver without fear that the frequency of operation will be unauthorized or in general use the transceiver under permitted operating conditions in regard to frequency, output power and so on. In order to accommodate such requirements, the prior art includes many examples of radiotelephone equipment which enable selected operation by the use of automatic control techniques.

Hence, a prior art system employs punched plastic cards which are read or scanned by a card reader. The data contained on such cards is converted into proper control voltages or levels to enable the apparatus to control the frequency, mode and output power of the radiotelephone. This system requires elaborate card storage facilities, relatively expensive card reading devices and further requires a large cable interface between the control apparatus and the radiotelephone.

Still other systems as the type shown in U.S. Pat. No. 3,581,019 entitled "Card Control to Radiotelephone" issued on May 25, 1971 to Donald P. Ryan employs a punched or embossed card which when inserted in a guide slot controls a cross bar matrix. The card, as indicated above, is decoded and the decode signals operate to control the matrix in order to provide control signals to the radiotelephone. Such systems employ a plurality of cards mounted in a rotating drum to enable multiple channel selection, while due to the mechanical nature of the device are relatively slow in effecting control.

It is therefore an object of the present invention to provide a control apparatus for a radiotelephone which is capable of controlling the channel frequency, mode of operation (transmit or receive) and power levels based on the dialing of a multiple digit number. The apparatus employs a programmable read only member (PROM) which can be erased and reprogrammed to provide channel selection. Based on the apparatus employed, the system requires a reduced number of interconnecting lines to afford remote control of the transceiver and results in a significant decrease in the per channel cost than would be available with prior art devices. Based on the format of the apparatus, the system is adaptable for expansion and hence, can accommodate with a minimum of changes, additional channels.

It is, of course, understood that while the system to be described is specifically intended for use in a radiotelephone, the techniques and apparatus to be described can be used in individual radio receivers and/or transmitters.

BRIEF SUMMARY OF THE INVENTION

A transceiver apparatus of the type capable of responding to any selected frequency contained within a predetermined band of operating frequencies by providing a local frequency signal indicative of said selected frequency includes in combination therewith apparatus for automatically controlling the operating characteristics of the transceiver comprising, memory means having a plurality of unique address locations, each location having stored therein a plurality of bits with a first portion of said bits as stored indicative of a frequency of operation, and a second portion of said bits indicative of an operating power level, said memory having a plurality of input data lines for accessing any one of said address locations and a plurality of output lines for retrieving said plurality of bits as stored at one of said addresses when accessed, selectable switching means coupled to said data input lines for specifying an address location for said memory according to the setting of said switching means as determined by said selected frequency to cause said memory means to provide said stored bits on said output lines, a programmable frequency source capable of providing any one of a plurality of local frequency signals according to the application to control input lines associated with said source of a first portion of said bits, means for applying said first portion of said bits on said memory output lines to said control input lines of said source to cause said source to provide said local frequency signal indicative of said selected frequency and means responsive to said second portion of bits on said memory output lines for controlling the output level of said transceiver apparatus.

BRIEF DESCRIPTION OF THE DRAWINGS

FIGS. 2A and 2B, in combination, is a detailed schematic diagram partially in block form of a memory control and access circuit according to this invention.

DETAILED DESCRIPTION OF THE INVENTION

Figure 1:
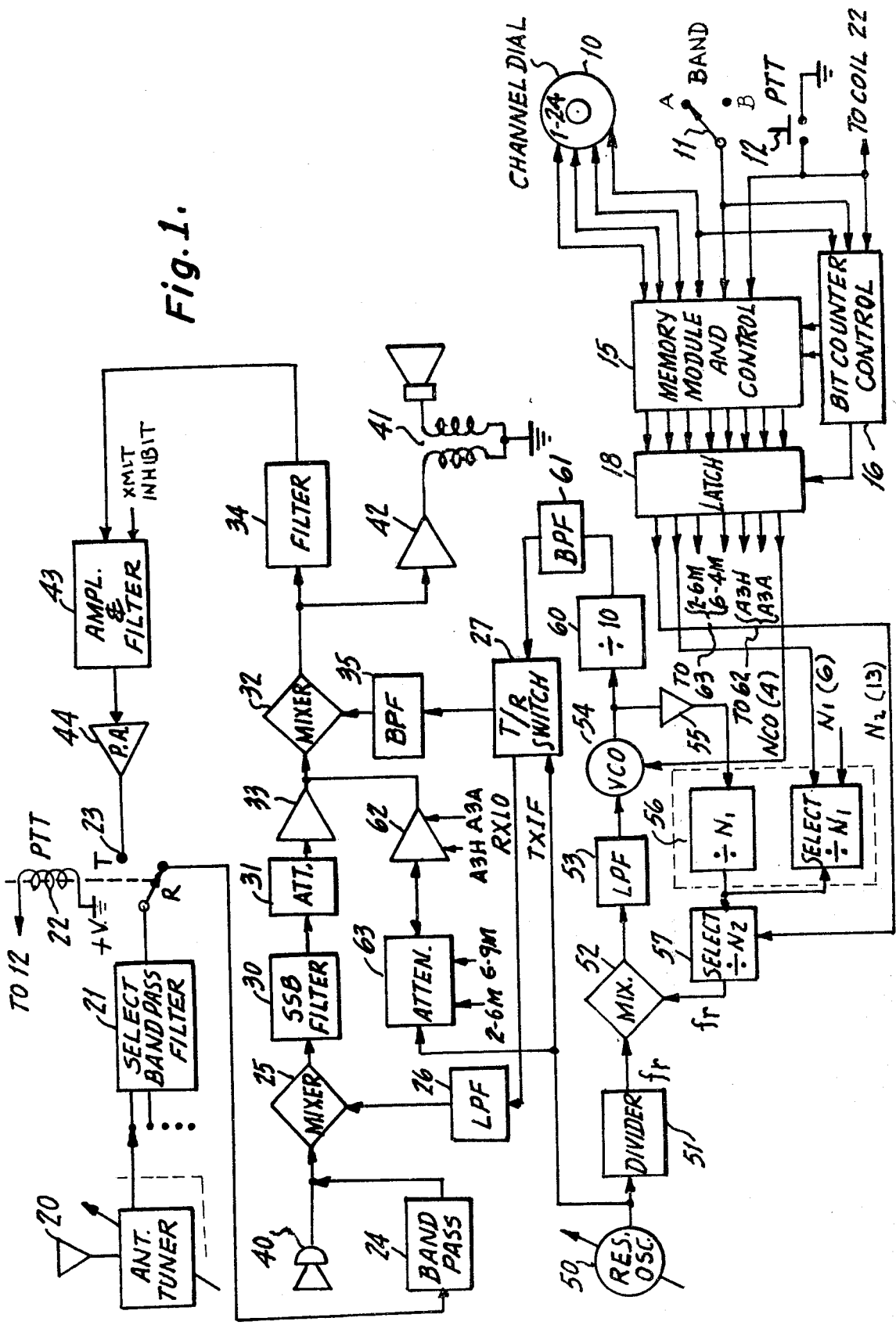
FIG. 1 is a block diagram of a transceiver employing a PROM memory and control according to this invention.

Referring to FIG. 1, there is shown a simplified block diagram of a transceiver or a combined radio receiver-transmitter apparatus and included to show the operation of the system. As indicated, the transceiver includes apparatus which is programmed to change channel frequency as a digital address is applied to the transceiver from a suitable switch arrangement or other source. In this manner, a code consisting of a predetermined number of digits is reduced to a lesser number of digits so that the user, by a switch selection, will automatically control the operating characteristics of the transceiver and hence, provide automatic control of the frequency, mode and output power of the unit.

FIG. 1 depicts a block diagram of a typical single sideband transceiver (SSB). While the transceiver depicted employs a total of twenty-four channels for transmission or reception, it is understood that any number of desired channels can be incorporated by employing the techniques to be described herein.

Shown in the FIGURE is a channel dial or rotary switch 10. The switch 10 is referenced as 1-24 to denote the twenty-four channel capability. In any event, the switch 10 is a twelve position rotary switch with an associated two position toggle switch 11 operative in an A position to determine a first twelve channel operation and in a B position to determine a second twelve channel operation, thus providing a total of twenty-four channel operation.

The switches 10 and 11 are by way of example only and could be a BCD (binary coded decimal) lever switch, a keyboard and so on as the channel number could be dialed as by the rotary switch 10 or entered serially as by a substitute switching means.

Also shown is a switch 12 designated as PTT (push to talk) and operative to enable one to access the transceiver via a microphone to enable two way communications.

The combination of switches 10,11 and 12 are all coupled to the input address lines of a memory module 15. Hence, the code generated on the output lines of the switches serve as an address code for the memory module 15, thus allowing one to access the proper channel and output levels, as will be described.

It is understood that the switches as 10 contain multiple output leads and hence, switch 10 can provide a four bit input line to the memory address input. Based on this, it is understood that the switch 10 could be associated with a decoder or converter to enable one to access the memory module 15 with any desired number of bits and hence, one can accommodate a greater number of input channels. The memory module 15 is a PROM device (programmable read only memory) and as such, can be erased and reprogrammed at will. Preferably, the memory module 15 may be an ultraviolet erasable type or an electrically alterable type.

Examples of suitable memory modules include the 1702, a PROM memory manufactured by the Intel Corporation, or the NCR 1105 manufactured by the National Cash Register Company. Other devices which can operate to serve the memory module 15 functions to be described are supplied by many other companies and such modules as 15 are readily available. For examples of such devices and their control and operation, see an article entitled "An Electrically Alterable ROM . . . : published in "Electronics", a McGraw-Hill publication in the issue dated Dec. 9, 1976 and written by James W. Kelley and David F. Millet of NEC Microcomputers, Inc., Lexington, Mass.

Such memory modules as 15 can be simply and efficiently programmed and reprogrammed at will, thus providing great flexibility in their use in a radio transceiver. The memory module 15 possesses a bit capacity of 2048. The channel address is organized as a thirty-two bit word, so that storage capacity is sixty-four channels per device. Such memory modules as 15 can be stacked to provide additional channels in increments of sixty-four.

The memory module is programmed at suitable memory locations to provide storage of a digital code which is used to control the transceiver. By utilizing the switches 10,11 and 12, one accesses the proper storage location in the memory and the memory output is used to change the synthesizer frequency, and hence the channel frequency, the power level and other related receiver transmitter circuitry. In this way, each change of channel via switches 10 and 11 automatically addresses the memory module 15 and the retrieved information is applied to the proper circuits, as will be described.

The memory module 15 which includes a 256×8 bit memory (2048 bits) contains at each address location, the frequency control, emission mode and VCO (voltage control oscillator) information for each of the twenty-four operating channels. The memory, upon access, provides four eight bit words on the output lines to provide this information. In this case, the switches and counter 16 provide an eight bit input signal to the memory module 15 to enable the memory 15 to read or provide the four words for each cycle. Four bits are provided from the rotary channel switch 10, one bit from the A/B selector switch 11, one bit from the push to talk switch PTT and two additional bits from the bit counter 16.

The bit counter 16, as will be shown in greater detail, counts from zero to three and stops at the count of three every time the channel switch 10, the A/B switch 11, or the PTT switch 12 is activated. Thus, each time the bit counter 16 is activated, four eight bit words are obtained from the memory module 15.

Coupled to the output lines of the memory module 15 is a series of latch circuits or storage registers 18. The latch circuits 18 function to store the four eight bit words at the memory output and are under control of the bit counter 16. Hence, at the end of a memory cycle, the four eight bit words are stored in the output latch circuit 18 and are used to control the transceiver circuitry.

TRANSCEIVER BLOCK DIAGRAM

As indicated above, the block diagram for the transceiver is shown in FIG. 1 in simplified form as certain operating characteristics and components are commonly employed in conventional transceivers. The control and operation of the transceiver as controlled by the memory module above described, are not conventional and hence, a brief description of the apparatus is believed to be warranted.

The transceiver includes an antenna 20 which may be employed during transmission and reception as is known. The antenna 20 is capable of being tuned to enable both optimum reception and transmission and techniques for tuning the antenna 20 are well known in the art. The antenna 20 is coupled to the input of a series of selectable band pass filters 20 to select a frequency band for reception or transmission and as such, the selectable band pass filters are selected under control of the same switches, which are used to tune the antenna 20. Such techniques for band selection as well as antenna tuning are known in the art and are not considered to be part of this invention.

The function of the band pass filters are to provide suspension of unwanted harmonics and for increased efficiency of operation. The band pass filter module may also contain an automatic level control circuit and a voltage standing wave detection (VSWR) to further provide efficiency and to monitor the effectiveness of the antenna during transmission. Such circuits are also known in the art.

Also shown coupled to the selectable band pass filter module 21 is a transmit-receive switch contact 23. Essentially, contact 23 places the tranceiver in a receive (R) or transmit (T) mode. The switch 23 is under control of a relay coil 22 which is operated in response to the activation of the PTT switch 12. Hence, when the PTT switch 12 is closed, the coil 22 operates to place the transceiver in the transmit (T) mode. When the switch 12 is not operated, the unit is in the receive (R) mode.

In the receive mode (R), the output of the band pass filter 21 and hence, the energy received by the antenna is coupled to the input of a band pass filter 24. The filter 24 conventionally is designed to accommodate the entire band of frequencies which the transceiver is designed for. For example, in a unit operating in the range between 2.0 to 9.0 MHz, the band pass 24 would accommodate this range.

In order to simplify the schematic and description, buffer amplifiers as well as specific amplifier circuits employed for gain or additional selectivity are not shown in the schematic, but are conventionally included in actual embodiments.

The received frequency is applied via the band pass filter 24 to one input of a mixer circuit 25. The other input of the mixer circuit 25 is obtained via a low pass filter 26 coupled to a T/R (transmit-receive) switch 27 also operated by relay coil 22. The input signal is derived from a synthesizer module to be described.

The function of the mixer 25 is to provide mixing between the received or incoming signal with the local oscillator signal as obtained from the synthesizer to provide at output, an I.F. or intermediate frequency signal. The mixer 24 provides both an upper and lower sideband and is a balanced device. The desired sideband is filtered by means of the single sideband filter 30 and applied via an attenuator 31 to the input of a second mixer 32. The attenuator 31 is adjusted for a first value during the receive mode and a second value during the transmit mode.

The mixer 32 receives the I.F. signal via the attenuator 31 and amplifier 33 at one input. The other input is again obtained from the synthesizer and during the receive mode, this frequency is specified at the center of the I.F. to thereby obtain at the output of the mixer 32 during the receive mode, an audio signal indicative of the modulation on the received incoming signal. This audio signal is then applied to a filter and audio amplifier 42 which drives a suitable speaker 41 to enable the user to respond to the incoming information.

During the transmit mode, the user activates the PTT switch 12. The relay coil 22 operates and the switches 40 23 and 27 are placed in the transmit position.

As shown, a microphone 40 is coupled to input of mixer 25. The audio signals generated by the microphone 40 are mixed with the local oscillator signal during the transmit mode via the TR switch 27 to obtain an intermediate frequency (IF) signal having the audio signal from microphone 40 modulated thereon. This signal is again coupled through the SSB filter 30 via attenuator 31 (now set for the transmit (T) mode) into mixer 32. Mixer 32 now receives the local oscillator signal via the T/R switch 27 and the band pass filter 35. Thus, the mixer 32 now provides the output frequency to be transmitted. This frequency is filtered by means of a filter 34. Filter 34 passes the range of the signals to be transmitted. The output or frequency to be transmitted is coupled to an exciter amplifier and filter module 43, a power amplifier 44 and thence via the contact 23 to the band pass or harmonic filter section 21 where it activates the antenna 20 to cause transmission.

As noted, the above description is relatively brief and indicates to one the general operating characteristics of a transceiver. In order to gain a full understanding of the invention disclosed herein and the control afforded by the memory module and address switches, the novel part of the invention including the synthesizer and the control thereof will be described.

Before proceeding with the description, it is noted that the techniques to be described herein have applicability to a transceiver in particular, but are applicable and can be employed in receiver or transmitter design when such are fabricated as separate apparatus. It will also be appreciated that in order for one to gain a clearer insight to the operation, the above described transceiver will be assigned an operating range in regard to frequency of reception and transmission as well as specification of the intermediate frequency. For present purposes, assume that the transceiver shown is specified to operate to transmit or receive frequencies in the band between 2 to 9 MHz and that the intermediate frequency or IF is centered about 10.7 MHz. As indicated, any other frequency range as well as different intermediate frequencies may be accommodated, as well.

The transceiver employs a frequency synthesizer to develop the local oscillator and transmitter carrier frequencies for operation in the desired frequency band. The memory module 15 controls the oscillator frequencies as well as the synthesizer to enable proper operation.

A reference oscillator 50 is shown. The oscillator 50 may be crystal controlled and is relatively stable. The output of the oscillator 50 is coupled to the input of a divider 51, which may be a binary divider or other suitable device. The divider 51 operates to divide the oscillator 50 frequency by a predetermined integer. In the above case, the oscillator frequency is specified at 10.7 MHz and the divider 51 operates to divide this frequency by 10.7K thus providing an output of 1,000 Hz or a stable reference frequency for the frequency control loop contained as part of the synthesizer.

The output of the divider 51 is coupled to one input of a mixer 52. The output of mixer 52 is coupled via a low pass filter 53 to the control input of a voltage or variable control oscillator 54 (VCO). Oscillators as 54 are known in the art and the frequency of the same can be varied by means of a variable reactance device as a varactor diode. The oscillator is selected to operate within a range between 127 MHz to 197 MHz, depending upon the frequency to be transmitted or received. A control input to the oscillator is coupled directly to the latch circuits 18 associated with the memory module 15. Accordingly, the output of the memory module 15 sets the frequency of the oscillator 54 according to the data stored at the memory address location as accessed by the channel dial switch 10 and the frequency selector band switch 11.

It is noted that there is shown one lead coupled to the oscillator 54 from the latch circuitry 18, but essentially this lead signifies a plurality of control bits (four in this example) to vary the oscillator 54 frequency as desired to accommodate the above specified ranges. This memory control is a coarse control and the four bits are used to switch or vary the reactance of the oscillator 54 to place the same at a frequency near the desired setting.

The output of the oscillator 54 is coupled via an amplifier 55 to the input of a controllable frequency divider 56. The divider 56 may be a binary divider whose division ratio ($N_1$) can be selected to enable division by a specified factor to provide a frequency used in the feedback loop and hence, to control the oscillator 54. The division ratio of the divider 56 is selected and specified by the output from the memory module 15 designated as the $N_1$ input. Again, this input consists of multiple bits (six bits) to enable the setting of the bistable multivibrators in the divider 56 to a value indicative of the frequency of operation of the transceiver.

The divider 56 will provide 100 Hz step capability in specifying the setting of the VCO 54 to enable exact and accurate tuning of the transceiver during both the transmit and receive modes.

The output of the divider module 56 is further coupled to the input of another divider module 57 ($N_2$). This divider also has controllable division capability and the division factor is again specified by the memory module 15 via the latch output circuits 18. In this manner, the lead designated as $N_2$ provides a plurality of bits (thirteen) to control the division ratio of the divider 57.

The above described apparatus constitutes a control loop for controlling and maintaining the frequency of the VCO 54 by means of a feedback signal which serves to vary the reactance of a varactor diode or another variable impedance device associated with the oscillator 54. The dividers 56 and 57 in the feedback loop serve to divide the oscillator frequency by a predetermined factor as specified by the information stored in a memory address for the particular channel dialed and selected by switches 10 and 11. If the oscillator is correct in frequency, the input frequency to mixer 52 via the divider 57 will equal the frequency from divider 51 and no error signal will be provided to control the oscillator 54. If the frequencies are not equal, an error signal will be developed at the output of mixer 52 and this signal will vary the oscillator 54 frequency to raise or lower the same depending upon the magnitude and sign of the error.

The output of the VCO 54 as controlled in frequency is coupled to the input of a divide by ten module 60 and thence through a band pass filter 61. The band pass filter 61 is selected to pass the permitted range of oscillator frequencies divided by ten (12.7 to 19.7 MHz) to the T/R switch 27. Switch 27 operates to pass the frequency at the output of filter 61 to both mixers 25 and 32 depending upon operation of the transceiver in either the receive or transmit mode.

Also shown coupled to the input of mixer 32 is the output of a gain controlled amplifier 62. The gain of amplifier 62 is controlled by signals applied to the A3H or A3A leads. These signals or levels are obtained from the memory module 15 as stored at the selected address and operate to control the input to mixer 32 during a transmission mode. The amplifier 62 has the input coupled to the output of a controllable attenuator 63. Attenuator 63 is also controlled by data stored in memory 15 and has one input level for the first band of frequencies (2-6 MHz) and another level for the second band of frequencies (6-9 MHz). The controllable attenuator 63 has its input coupled to the output of the reference oscillator 50 and is used to provide carrier injection for mixer 32 during specified transceiver operation. The levels of both the attenuator 63 and the amplifier 62 are specified by the bits stored in the memory module 15 as shown in the diagram.

The advantages of a transceiver operating as specified in FIG. 1 are many as all data for local oscillator control and level control for both the transmit and receive modes are stored in the memory module 15 and hence, each unit can be preprogrammed to enable tuning to specified channels within the frequency band of operation (2 to 9 MHz). This capability has widespread use in radio telephony and other systems as well. For example, the synthesizer described above contains the VCO 54 in a control loop and each parameter such as the coarse tuning of oscillator 54 (four bits), the division ratios of dividers 56 and 57 (nineteen bits total) are stored in a memory address and accessed via the switches 10,11 and 12.

The synthesizer is capable of being tuned between the range of 12.7 to 19.7 MHz in 100 Hz steps. Hence, one may tune to any channel within the range of the transceiver (2 to 9 MHz) in one hundred cycle steps. Each step constitutes a different channel. The data stored in the memory assures that the desired channels will be accessed to enable an operator to quickly and accurately receive and transmit on those channels stored and specified within the memory module 15.

An example of a typical operation in regard to specifying the operating frequencies as noted above will be given. Assume that the transceiver is to operate at 9,000,000 Hz or 9 MHz. The operator selects this frequency by selecting 9.0 MHz on the channel dial 10 and by placing the switch 11 in the B position. These inputs to the memory specify a five bit address code. If the code is a binary code, five bits enable one to access thirty-two unique locations. The code manifested by the setting of the switches 10 and 11 causes the memory to access the data stored in the memory location associated with the five unique bits specified by switches 10 and 11.

Four bits as stored in the memory address are used to set the oscillator 54 frequency within a range of about 197 MHz. It is, of course, noted that this setting by the four memory bits is a coarse indication and the oscillator 54 may not be tuned to exactly this frequency. The memory data stored at the accessed location also specifies the division ratio for divider 56 by means of the six $N_1$ bits. These six bits can uniquely specify sixty-four different division ratios. In this case, the divider 64 is caused to divide the VCO output by a factor of forty (40). Hence, if the frequency of the oscillator 54 were at 197 MHz, the output of divider 56 would be at 4.925 MHz or 4,925,000 Hz.

The memory also serves to set the division ratio of divider ($N_2$) 57 by the thirteen bits stored at the address. It is again noted that thirteen bits can specify in excess of 8,000 division ratios. The divider 57 is caused to divide the output of divider 56 by a factor of 4,925. Hence, the output of divider 57 if oscillator 54 is at 197 MHz is 1,000 Hz or 1 KHz. This is applied to one input of mixer 52. The other input of mixer 52 is also at 1,000 Hz as oscillator 50 is set at 10.7 MHz and divider 51 divides by 10,700. Thus, if the oscillator 54 were not at 197 MHz, an error signal would be provided at the output of mixer 52 and applied to the low pass filter 53 to control the oscillator 54 to provide an output frequency of 197 MHz. This output frequency is divided by a factor of ten via the fixed divider 60 and hence, the frequency of 19.7 MHz is applied to the TR switch 27.

During the receive mode, the input to mixer 25 via the band pass 24 contains a received frequency of 9.0 MHz. The other input to mixer 25 during the receive mode is the local oscillator frequency of 19.7 MHz. The filter 30 is a narrow band filter centered about the I.F. frequency of 10.7 MHz which is the lower sideband product of mixer 25; as equal to the local oscillator frequency of 19.7 MHz subtracted from the incoming desired frequency of 9.0 MHz. Hence, the transceiver captures the 9.0 MHz signal as transmitted. The 10.7 MHz I.F. frequency is demodulated by mixer 32 by injecting the 10.7 MHz reference signal via oscillator 50 to develop at the output of mixer 32, the audio information contained in the selected sideband.

During the transmit mode, the PTT switch is operated and thus relay 22 places the transceiver in the transmit mode. The TR switch 27 now applies a 10.7 MHz signal to the mixer 25. The audio signal as applied to the other input of mixer 25 modulates the 10.7 MHz input. This signal is passed directly through the SSB filter 30 to mixer 32. The mixer 32 now receives the local oscillator signal of 19.7 MHz via the TR switch 27. The filter 34 will only pass the lower sideband of 19.7 MHz minus 10.7 MHz or a 9.0 MHz signal modulated by the audio information. This signal is amplified by the linear power amplifier 43 and 44 and coupled to the antenna 20 for transmission. The power level of the signal is controlled by attenuator 63 and amplifier 62 according to the data stored in memory and hence, the entire operation of the unit in both the receive and transmit mode is so controlled by the data stored in memory.

One can thus ascertain that if one desired to operate at 2.0 MHz or the low end, the switch 10 would be set at 2.0 MHz and the switch 11 would be placed in the A position. In this manner, the oscillator 54 would be tuned by the memory data bits to approximately 127 MHz. The divider 56 would be set to divide by a factor of 40 to provide at its output, a signal of 3.175 MHz. Divider 57 would be controlled to divide by 3,175 to provide the 1 KHz signal to mixer 51. In this manner, the TR switch 27 would receive the local oscillator frequency of 12.7 MHz, the lower sideband would be 12.7 MHz minus the I.F. of 10.7 MHz or 2.0 MHz.

This same system operation will occur for the entire band of 2.0 to 9.0 MHz in steps of one hundred cycles to thus enable any transceiver employing the above described components to operate within twenty-four or more channels within the band in one hundred cycle increments and totally under control of the memory module 15 as effecting and controlling the circuitry of the transceiver as above described.

Figure 2B:
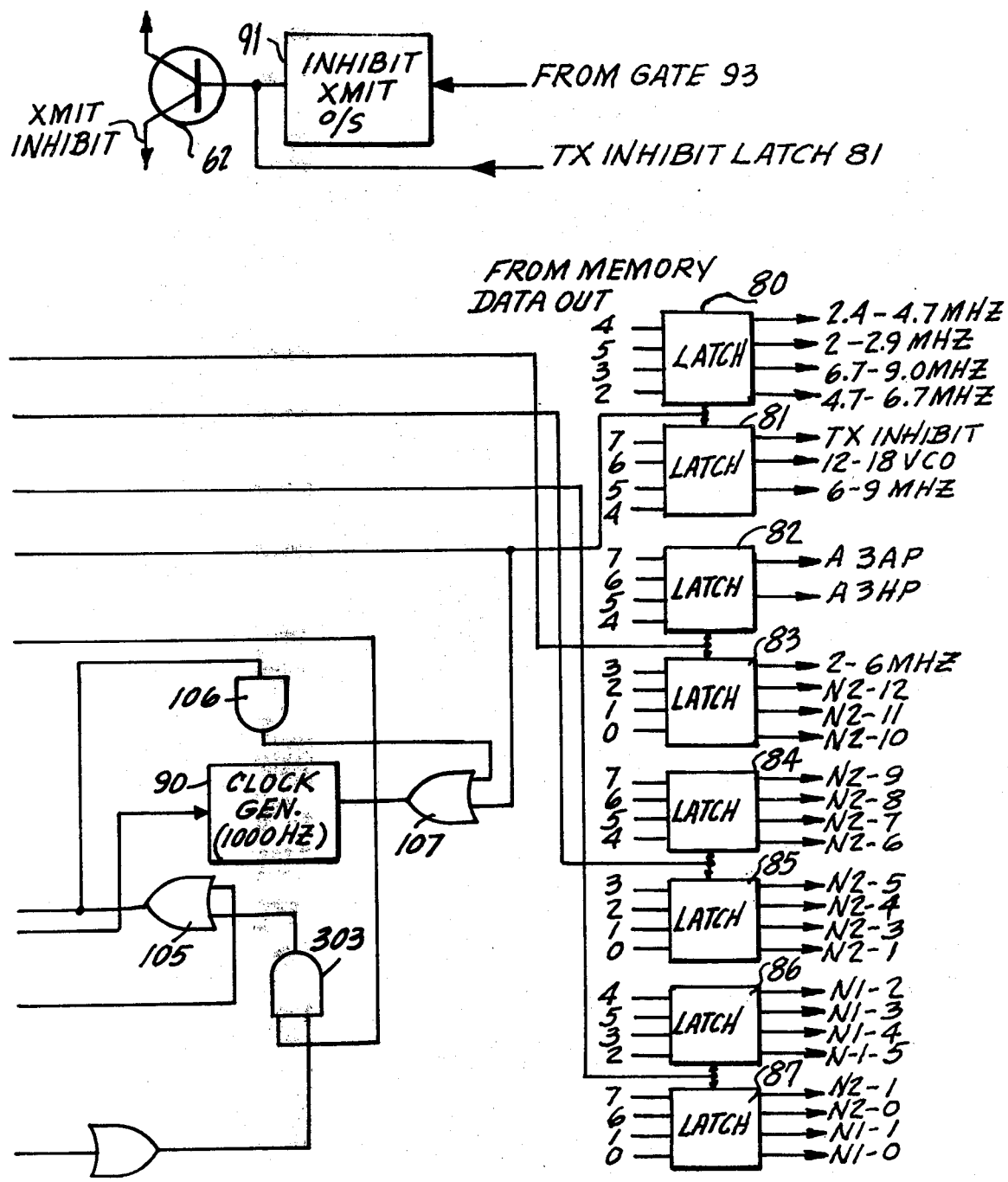

Referring to FIG. 2, there is shown a detailed circuit schematic of a memory and switch control board which is included within the transceiver as depicted in FIG. 1 and used to control the memory and access the proper storage locations and bit positions for control of the VCO 54, the dividers 56 and 57, the attenuator 63, as will be explained.

Shown in FIG. 2 is the memory module 70. The memory module 70 is a PROM device available from many sources as a conventional component and is a 256×8 bit memory or 2048 total bits. Such memory modules as indicated, are available from companies as indicated above as well as from such companies as RCA, Texas Instruments, Motorola and so on. The memory has eight input data lines and has stored therein at selected address locations, information relating to frequency control, emission mode, VCO range and control information for each channel.

The eight input data lines are accessed as follows: Four bits are derived from the rotary channel switch (10 of FIG. 1) 71. The rotary channel switch shown in FIG. 2 has the four output leads biased via resistors R9, R10, R11 and R12 to a +5 volt supply line and these inputs are coupled directly to memory input data or address lines 4, 5, 6 and 7. A further bit is derived from the A/B selector switch 72 (11 of FIG. 1) and applied to data input 3. A further input bit is derived from the PTT switch 73 (12 of FIG. 1) and is coupled via a transistor reference level circuit 60 to the data input 2. Two additional bits for the memory input (1,0) are derived from a two bit counter 74 (16 of FIG. 1) consisting of two J-K binary multivibrators 75 and 76 arranged in a counting configuration. The output data lines of the memory are coupled to eight four bit latch circuits designated as 80 to 87. The latch circuits store the information retrieved by the memory 70 as four words, each consisting of eight bits.

The two bit counter 74 counts to four each time the A/B selector switch 72 or the PTT switch 73 is activated or one-half second after the channel switch 71 is rotated. A clock circuit 90 operates the counter 74 and provides three clock pulses each time the counter is reset. The output leads from the counter are coupled to the data inputs 1 and 0 of the memory input data lines.

Also shown in the diagram is an inhibit timer 91. The timer 91 inhibits the transmitter portion of the transceiver for 110 milliseconds whenever the PTT switch 73 is activated. As seen from the FIGURE, the PTT switch interfaces with logic gates as 92 and 93; which gates control the operation of the timer 91. A further timer 95 is a half second timer and serves to provide a 0.5 second delay before allowing the 1,000 Hz clock pulses to be applied to the counter 74 via the timing generator 90. This occurs whenever the channel selector dial 71 is rotated or selected. At the end of the 0.5 second delay, the counter 74 is reset to zero and the 1,000 Hz clock is turned on when the delay is completed.

As indicated, the memory module 70 is a 2,048 bit programmable ROM (read only memory). The memory 70 generates four eight bit words to provide the following information:

(1) Thirteen bits for the synthesizer divider 57 of FIG. 1 ($N_2$-0 through $N_2$-12). These bits are stored in the proper memory address located and applied to and stored in the latch circuits 87, 86, 85, 84 and 83.

(2) Six bits for the synthesizer divider 56 ($N_1$-0 to $N_1$-5). These bits are available at the output of the latch circuits 87 and 86.

(3) Four bits for controlling the VCO 54 for the proper frequency range. These bits are stored in the latch circuit 80.

(4) Two bits for the emission mode A3A or A3H as stored in the latch circuit 82.

There is a further bit (TX) shown as stored in the latch circuit 81 for inhibiting the transmission (TX inhibit) to prevent the transmitter from transmitting an unauthorized frequency. There are six bits which are not used of the thirty-two bits supplied by the memory. It is, of course understood that these bits could be employed to provide additional control functions, if necessary.

The TX bit, if sent by the memory, operates to disable transmission via transistor 62 which places a ground on a transmitter amplifier to turn the same off.

As indicated, the input data or address lines 4 to 7 are connected to the channel switch 71. The switch 71 is a twelve position binary output switch. The A/B selector switch 72 is a two position switch and is connected to data input lead 3. The combination of switches 71 and 72 allow one to select twelve channels and hence, twelve memory addresses in the A position and twelve channels and hence, twelve memory addresses in the B position. The push to talk switch (PTT) 73 is coupled to the data input line 2 and specifies the mode of operation for the transceiver and thus informs the memory as to whether there is a transmit or receiver mode.

As indicated, the last two data input bits 1 and 0 are controlled by the two bit counter 74. The counter 74 counts from 0 to 3 and stops at three each time the channel switch 71, the A/B selector switch 72 or the PTT switch 73 is activated. Thus, every time the counter 74 is activated, four eight bit words are obtained at the output data lines of the memory or PROM 70. These words are stored in the latch circuits 80 to 87. The latch circuits are quadruple bistable latches and hence, eight such circuits can store thirty-two bits or four eight bit words. Each pair holds one eight bit word. The latch circuits are controlled to store the information under control of the two bit counter 74.

Shown coupled between the counter 74 and the clock input to the latch circuits are gates 100, 101, 102 and 103. These gates control the operation of the latches 80 to 87 and determine the storage of the memory word. The information on the input lines of the latch circuits which are coupled to the output data lines of the memory is transferred to the output of the latch circuit when the clock input leads of the latch circuits are high or at a binary one. This information is retained at the output leads of the latch circuits after the clock goes low or to binary zero and stored until the clock goes high again. The clock signal for the first pair of latches 86 and 87 is obtained from gate 102 or from the zero count of counter 74. The clock for the second pair of latches 84 and 85 is obtained from gate 101, the third pair 83 and 82 from gate 100 and the fourth pair 80 and 81 from gate 103. These gates 100, 101, 102 and 103 decode the counts zero, one, two and three of the counter 74.

As indicated, counter 74 is a two bit counter and the outputs $Q_1$ and $Q_2$ are normally high. However, when the channel switch 71 is rotated, the A/B selector switch 72 is set. As the PTT switch 73 is pressed or activated, a negative going pulse is generated at the output of gate 105. This pulse clears the counter 74 and forces the outputs $Q_1$ and $Q_2$ to go low. At this time, the 1,000 Hz clock signal is turned on via gates 106 and 107 which activate the clock pulse generator 90 to cause the counter 74 to commence counting if the 0.5 second delay via module 95 is complete.

When the counter 74 reaches the count of three, the $Q_1$ and $Q_2$ outputs go high and the clock generator 90 is stopped or inhibited. The output of the counter 74 is connected in parallel to the memory inputs 1 and 0 and to the latch clock inputs.

When the counter 74 is stopped, the $Q_1$ and $Q_2$ outputs are low and the output of gate 103 is high. Gate 107 has an input coupled to gate 103 and its output is low. This low at the output of gate 107 resets the clock generator 90 and holds it reset as long as the gate 107 output is low. When the counter 74 is cleared, the outputs $\overline{Q}_1$ and $\overline{Q}_2$ go high, thus the output of gate 103 is low and gate 107 will go high if the output of gate 106 is low indicating an end of the 0.5 second delay. As a result, the reset of the clock generator goes high and the clock operation commences.

Once the clock generator 90 commences operation, the counter 74 operates. When the counter 74 reaches the count of three, the $\overline{Q}_1$ and $\overline{Q}_2$ go low and reset the clock output to low. The counter 74 stops in the low condition until it is cleared again.

When the PTT switch 73 is activated, the output of gate 93 goes low. This generates a trigger level for the inhibit one-shot 91. One-shot 91 provides a 110 millisecond signal which activates transistor 62. The positive voltage through the transistor disables the exciter for 110 milliseconds to inhibit the transmitter operation.

When the channel switch 71 is rotated, at least one of its four BCD output leads change state. This new state is, of course, applied to the input data lines of the PROM or memory 70 and is also applied to the inputs of an exclusive OR circuit including gates 200, 201, 202 and 203. The OR gates 200, 201, 202 and 203 interface with an NOR gate 204. As seen, each of the four output lines from the switch 71 as coupled to gates 200 to 203 are also directed through inverter amplifiers 206 to 209 to one input of the associated gates. The inverter amplifier 203 has a capacitor 210 connected to its output to hold at least one input of the exclusive OR configuration unchanged for a few milliseconds; while a transistion occurs in another input. This transistion assures that at least one gate 200 to 203 goes low. As a result, the output of the NOR gate 204 goes high for a few milliseconds, thus the output of gate 205 goes low. This negative output from gate 205 triggers the 0.5 second delay one-shot 95 to give a positive output to thus clear the counter 74 via gate 105.

As above described, any one of three activations clears the two bit counter 74. Thus, the rotation of the channel select switch 71, the setting of switch 72 or the activation of switch 73 all serve to clear the counter 74.

Thus, the rotation of the channel switch causes the counter 74 to be reset via the gate 105. At the end of the 0.5 second pulse as applied to gate 105 via the one-shot delay 95, the output of gate 106 goes low. Gate 103 is also low since the counter 74 is at an all zero state and hence, gate 107 is high and the clock generator 90 starts.

When the A/B selector switch 72 is set, gate 300 goes low for a few milliseconds. Gate 300 is operated by gate 299 which has an RC time constant at its output. Gate 300 causes gate 301 to go high to cause gate 105 to reset the counter.

When the PTT switch 73 is activated, gate 93 is activated for a few milliseconds due to the time constants present in the inputs of both gates 92 and 93. Hence, the output of gate 93 goes low for a few milliseconds. This causes gate 105 to go low via gate 303 and the counter 74 is again reset.

It should be apparent that the counter 74 provides a total count of two binary bits for each entire thirty-two bit word to be retrieved from the memory 70. Hence, the memory 70 is addressed by means of the channel select switch 71 to provide four unique input bits, one bit from the selector switch 72, one bit from PTT switch 73.

For example, assume one desired to access the memory based on the setting of the switch 71 to the three (3 MHz) megacycle position. The switch 72 is in the A position and there is a receive mode. The memory is addressed as follows:

| ADDRESS | CHANNEL SELECT 71 | A POSITION BAND 72 | PTT 73 | TWO BIT COUNTER 74 |
|---|---|---|---|---|
| 1st | 0011 | 0 | 0 | 00 |
| 2nd | 0011 | 0 | 0 | 01 |
| 3rd | 0011 | 0 | 0 | 10 |
| 4th | 0011 | 0 | 0 | 11 |

Thus, as can be seen, the selection of the 3 MHz channel specifies four unique input addresses for the memory 70. Each address contains one eight bit word and a total of thirty-two bits for each address are accessed via the above described operation.

From the above, it is noted that upon depression of the PTT switch 73, a binary one is inserted in place of the zero and hence, four different addresses are accessed during a transmit mode. It is understood that the memory format as available contains two hundred fifty-six addresses and each provides storage of eight bits (256×8=2048), but one requires at least twenty-six bits to specify operation for each channel in both a receive and transmit mode and all of the thirty-two bits in the four eight bit words are not used. Hence, for twenty-four channels on receive, one needs to access 24×44=96 addresses to utilize (96×8) 768 bits and this amount of addresses and bits are used for twenty-four channels in the transmit mode and hence, 192 addresses or storage locations are employed to specify twenty-four channels, leaving sixty-four addresses unused. One can thus see that expansion for additional channels is easily implemented. It is also seen that for the B position of switch 72, one again obtains unique addresses on the input data lines and hence, one accesses different addresses for a binary one in the B position of switch 72.

Thus, the memory 70 under control of the channel select switch 71, the A/B switch 72, the PTT switch 73 and the two bit counter 74 and control, is addressed to cause it to provide at its output four eight bit words. The data is stored in the latch circuits 80 to 87 and then used to control the synthesizer by tuning the VCO 54, selecting division factors for the dividers 56 and 57 and emission and mode control for the attenuator 63 and the amplifier 62.

It is, of course, understood that bistable dividers as those employed for dividers 56 and 57 can be directly programmed by the output levels or digital data retrived from the memory 70 and stored in the latch circuits 80 to 87. The data used for tuning the VCO can be converted into an analog voltage, if required to thereby provide discrete tuning for the VCO 54 by means of the converted digital to analog signal. Such techniques for controlling the frequency of an oscillator as well as digital to analog signal conversion are well known in the art. The VCO 54 can be directly controlled by using the digital bits as stored in memory to switch reactances in and out of the oscillator circuit as is also known.

In summation, there is shown a system and apparatus where a receiver, transmitter or transceiver can be programmed to change channel frequency as a digital address is applied to the unit via a switch, a keyboard or some other source. In this manner, a given code consisting of a lesser number of digits can be employed to enable an unskilled operator to utilize the apparatus without regard to governmental requirements and without the fear of transmitting at an unauthorized frequency or power level. The programmable features of the memory enable one to predetermine the channels of operation and to change such channels simply and efficiently as often as desired.

These and other advantages of the present apparatus should become apparent to those skilled in the art upon reading of the specification and all such alternatives are deemed to be encompassed within the scope of the claims appended hereto.

We claim:

1. In a radio transceiver apparatus of the type capable of responding to any selected frequency contained within a band of operating frequencies by providing a local frequency signal indicative of said selected frequency, the combination therewith of apparatus for automatically controlling the operating characteristics of said transceiver apparatus, comprising:

memory means having a plurality of unique address locations, each location having stored therein a plurality of bits, with a first portion of said bits as stored indicative of a frequency of operation, and a second portion of said bits indicative of an operating power level, said memory having a plurality of data input lines for accessing any one of said address locations and a plurality of output lines for retrieving said plurality of bits stored at one of said address locations when accessed, selectable switching means coupled to said data input lines to select said selected frequency by accessing a particular one of said address locations according to the setting of said switching means and to cause said memory means to provide said stored bits in said particular one of address locations on said output lines, a programmable frequency source capable of providing any one of a plurality of local frequency signals, said source capable of providing said local frequency signal according to the application to control input lines associated with said source of said first portion of bits, means for applying said first portion of said bits on said memory output lines to said control input lines of said frequency source to cause said source to provide said local frequency signal indicative of said selected frequency, and means responsive to said second portion of bits on said memory output lines for controlling the transmitted output power level of said transceiver apparatus.

2. The apparatus according to claim 1 wherein said programmable frequency source comprises:

a variable oscillator capable of being tuned to any one of a plurality of output frequencies, said oscillator having a control input which upon application thereto of a first series of bits causes said oscillator to provide said any one frequency according to said series of bits, a variable divider having an input coupled to said oscillator for providing an output frequency different from said oscillator frequency by a division factor, said divider having a control input for specifying any one of a number of division factors upon application to said divider control input of a second series of bits, a reference oscillator capable of providing at an output a stable reference frequency, means coupled to said oscillator and said divider for comparing said signals in frequency and to provide an error signal when the frequencies are not equal, means coupled to said oscillator and responsive to said error signal for varying the frequency thereof in a direction to reduce said error signal, means coupling a given number of said first portion of said bits to said control input of said oscillator to select said any one frequency, means coupling the remainder of said first portion of said bits to said control input of said divider to select said factor and therefore to provide said different output frequency relatively equal to said reference frequency.

3. The apparatus according to claim 1 further comprising another switch having a first position indicative of a transmission mode and a second position indicative of a receive mode, said switch having an output coupled to one of said memory input data lines for accessing a first location during a receive mode and a second location during a transmit mode.

4. The apparatus according to claim 1 further comprising at least a third bit stored in memory and indicative of an unauthorized frequency and means responsive to the presence of said third bit to deactivate said apparatus.

5. Apparatus for controlling the frequency of operation of a transceiver by providing a local signal at a specified frequency indicative of any one frequency within a band of operation, comprising:

- a frequency control loop including a variable controlled oscillator (VCO) capable of being tuned to any one of a plurality of frequencies, said variable oscillator having a control input for application thereto of a first number of bits indicative of a first frequency range, a divider having an input coupled to said oscillator and an output for providing a divided frequency signal, said divider having a control input adapted to receive a second number of bits for specifying a division factor selected according to said specified frequency to provide said divided signal within a specified range, a reference oscillator, comparison means coupled to said reference oscillator and said divider output to provide an error signal when the frequencies are different, and means for applying said error signal to said VCO to vary the frequency thereof according to said error signal,
- rotary dial switching means for providing a first code of a predetermined number of bits less than the sum of said first and second number of bits, said first code specifying said any one frequency,
- memory means having a plurality of unique address locations, said locations capable of having stored therein a number of words, each word consisting of a number of bits at least equal to the sum of said first and second number of bits, with a first portion of said word manifesting said first series of bits indicative of a frequency range for said VCO, and a second portion of said word manifesting a number of bits for specifying said division factor, said memory means having a plurality of input lines adapted to receive said first code for accessing any one of said address locations, with said input lines coupled to said switching means to cause said memory to provide said word at output lines associated with said memory,
- means for coupling said first series of bits on said memory output lines to said control input of said VCO,
- means for coupling said second series of bits on said memory output lines to said control input of said divider, and
- a band select switch coupled to said data input lines of said memory and operative to access a first portion of said memory locations in a first position and a second portion of said memory locations in a second position.

6. Apparatus for controlling the frequency of operation of a transceiver by providing a local signal at a specified frequency indicative of any one frequency within a band of operation, comprising:

- a frequency control loop including a variable controlled oscillator (VCO) capable of being tuned to any one of a plurality of frequencies, said variable oscillator having a control input for application thereto of a first number of bits indicative of a first frequency range, a divider having an input coupled to said oscillator and an output for providing a divided frequency signal, said divider having a control input adapted to receive a second number of bits for specifying a division factor selected according to said specified frequency to provide said divided signal within a specified range, a reference oscillator, comparison means coupled to said reference oscillator and said divider output to provide an error signal when the frequencies are different, and means for applying said error signal to said VCO to vary the frequency thereof according to said error signal,
- rotary dial switching means for providing a first code of a predetermined number of bits less than the sum of said first and second number of bits, said first code specifying said any one frequency,
- memory means having a plurality of unique address locations, said locations capable of having stored therein a number of words, each word consisting of a number of bits at least equal to the sum of said first and second number of bits, with a first portion of said word manifesting said first series of bits indicative of a frequency range of said VCO, and a second portion of said word manifesting a number of bits for specifying said division factor, said memory means having a plurality of input lines adapted to receive said first code for accessing any one of said address locations, with said input lines coupled to said switching means to cause said memory to provide said word at output lines associated with said memory,
- means for coupling said first series of bits on said memory output lines to said control input of said VCO,
- means for coupling said second series of bits on said memory output lines to said control input of said divider,
- said memory having stored therein at a specified address a first portion of said word at a first address location and a second portion of said word at a second address location,
- means responsive to the activation of said switching means to cause said memory to first provide said first portion of said word and then said second portion, and
- means responsive to said memory operation for storing said first and second portions and therefore said entire word.

7. In a transceiver apparatus for enabling a user to receive and transmit automatically at the correct frequency and power levels, comprising:

- a memory having a plurality of unique address locations, each location having stored therein predetermined number of bits indicative of a receive or transmit mode, with a first portion of said bits manifesting the frequency of operation and a second portion manifesting the power level, said memory having a plurality of data input lines for accessing any one of said locations and a plurality of output lines for retrieving said plurality of bits stored at said address,
- first switching means coupled to a first predetermined number of said data input lines for specifying a portion of said address according to the desired frequency, second switching means coupled to a second predetermined number of said data input lines for specifying a portion of said address according to a range of frequencies containing said desired frequency, third switching means coupled to a third predetermined number of data input lines for specifying a portion of said address according to a transmit or receive mode of operation of said transceiver, first means coupled to a first number of said memory output lines for providing a frequency within said range according to a selected portion of said first portion of said bits, second means coupled to a second number of memory output lines for providing said correct frequency according to another selected portion of said first portion of bits, third means coupled to a third number of memory output lines for providing a correct power level according to said second portion of bits.

8. The apparatus according to claim 7 wherein said first switching means comprises a BCD switch for selecting a channel indicative of said desired frequency.

9. The apparatus according to claim 7 wherein said second switching means comprises a two position switch for selecting a first or a second range of frequencies.

10. The apparatus according to claim 7 wherein said third switching means comprises a transmit-receive switch operative to implement a receive mode in a first position and a transmit mode in a second position.

11. The apparatus according to claim 7 wherein said first means includes a variable oscillator having an input control adapted to respond to said selected portion of said first portion of bits to provide a frequency at an output within said range.

12. The apparatus according to claim 11 wherein said second means includes a variable frequency divider coupled to said oscillator in a control loop, and having an input adapted to receive said another portion of said first portion of bits for specifying a division factor necessary to control said oscillator as contained in said loop.

13. The apparatus according to claim 7 wherein said third means includes a variable attenuator responsive to said second portion of bits for determining the output level during a transmission mode.

14. The apparatus according to claim 7 further comprising:

a bit counter having an output coupled to a fourth predetermined number of memory data input lines and responsive to the activation of any one of said first, second, or third switching means for causing said memory to provide said plurality of bits as stored in more than one of said addresses.

15. The apparatus according to claim 14 further comprising:

storage means coupled to said counter and operative to store the bits accessed from each memory location as retrieved.

16. A method of controlling the operation of a transceiver, comprising the steps of:

storing in a memory a plurality of bits at each of a given number of storage locations, with a first portion of said bits indicative of one frequency of a plurality of frequencies in a band of operation and a second portion of said bits indicative of an operating power level, selecting one of said locations, retrieving and storing said first portion of said bits during a first operation, retrieving and storing said second portion of said bits during a second operation, applying said first portion of said bits to a controllable frequency source to cause said source to provide said frequency according to said first bit content, and applying said second portion of said bits to a power level control device to cause said power level control device to provide an output according to said second bit content.

17. The method according to claim 16 wherein the step of selecting said location includes selectively switching from a first one of said locations to another of said locations according to said one frequency selected.

18. The method according to claim 16 further including:

selecting a first series of locations during a transmission mode and selecting a second series of locations during a receive mode.

* * * * *